(12) United States Patent
Kanda (10) Patent No.: US 9,186,997 B2
(45) Date of Patent: Nov. 17, 2015

(54) HYBRID ELECTRIC LOCOMOTIVE

(75) Inventor: Masahiko Kanda, Musashino (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 253 days.

(21) Appl. No.: 13/615,457

(22) Filed: Sep. 13, 2012

(65) Prior Publication Data

US 2013/0152815 A1    Jun. 20, 2013

(30) Foreign Application Priority Data

Dec. 20, 2011 (JP) .................................. 2011-278316

(51) Int. Cl.
- *B61C 3/00* (2006.01)
- *B60L 11/08* (2006.01)
- *B60L 11/12* (2006.01)

(52) U.S. Cl.
CPC .................. *B60L 11/08* (2013.01); *B60L 11/12* (2013.01); *B60L 2200/26* (2013.01); *Y02T 10/648* (2013.01); *Y02T 10/7005* (2013.01)

(58) Field of Classification Search
CPC ......... B60L 11/08; B60L 11/12; B60L 11/02; B60L 11/123; B60L 2200/26; B60L 9/00; B60L 7/24; B60L 15/2045
USPC ............................ 105/35, 49, 50, 51, 62.1, 65
See application file for complete search history.

(56) References Cited

U.S. PATENT DOCUMENTS

| | | | | |
|---|---|---|---|---|
| 2,317,849 A | * | 4/1943 | Essl ................................. | 105/35 |
| 8,511,449 B2 | * | 8/2013 | Kumar ............................. | 191/4 |
| 8,640,629 B2 | * | 2/2014 | Barbee et al. .................... | 105/61 |
| 2002/0170757 A1 | * | 11/2002 | Kitada et al. .................. | 180/65.2 |
| 2008/0121136 A1 | * | 5/2008 | Mari et al. ....................... | 105/35 |
| 2008/0148993 A1 | * | 6/2008 | Mack ................................ | 105/35 |
| 2010/0144219 A1 | * | 6/2010 | Balogh et al. ..................... | 440/3 |
| 2011/0273009 A1 | * | 11/2011 | Kumar ............................ | 307/9.1 |
| 2011/0315043 A1 | * | 12/2011 | Kumar ............................ | 105/35 |
| 2012/0160124 A1 | * | 6/2012 | Barbee et al. .................... | 105/35 |
| 2013/0152815 A1 | * | 6/2013 | Kanda ............................. | 105/35 |

FOREIGN PATENT DOCUMENTS

| | | |
|---|---|---|
| JP | 8-198102 A | 8/1996 |
| JP | 08244607 A | 9/1996 |
| JP | 10191505 A | 7/1998 |
| JP | 2003-106342 A | 4/2003 |

(Continued)

OTHER PUBLICATIONS

Chinese Office Action (and English translation thereof) dated Apr. 8, 2015, issued in counterpart Chinese Application No. 201210558950.7.

(Continued)

*Primary Examiner* — Jason C Smith
(74) *Attorney, Agent, or Firm* — Holtz, Holtz, Goodman & Chick PC (57) ABSTRACT

According to one embodiment, a hybrid electric locomotive includes electric motors, a first engine and a second engine mounted in a vehicle main body for driving generators, a third engine mounted in the vehicle main body, having a smaller capacity than those of the first engine and the second engine, for driving a generator, at least one electric device mounted in the vehicle main body, and a storage battery which is connected to the first engine, the second engine, the third engine, and the electric device.

13 Claims, 5 Drawing Sheets

(56) References Cited

FOREIGN PATENT DOCUMENTS

| JP | 2004282859 A | 10/2004 |
|----|--------------|---------|
| JP | 2004336833 A | 11/2004 |
| JP | 2005083218 A | 3/2005 |
| JP | 2007143290 A | 6/2007 |

OTHER PUBLICATIONS

Japanese Office Action dated Feb. 3, 2015 issued in counterpart Japanese Application No. 2011-278316.

* cited by examiner

HYBRID ELECTRIC LOCOMOTIVE

CROSS-REFERENCE TO RELATED APPLICATIONS

This application is based upon and claims the benefit of priority from Japanese Patent Application No. 2011-278316, filed Dec. 20, 2011, the entire contents of which are incorporated herein by reference.

FIELD

Embodiments described herein relate generally to a hybrid electric locomotive in which an engine, a generator, and an electric motor to drive a vehicle by generated electric power are mounted.

BACKGROUND

As a railway vehicle that travels on a rail, an electric locomotive that drives wheels by an electric motor to travel is generally used. In recent years, there has been suggested a hybrid electric locomotive or an electric diesel locomotive that has an engine and a generator mounted therein, drives the generator using an output from the engine to generate electric power, and supplies the electric power to a main electric motor.

As the hybrid electric locomotive, there is known an electric locomotive having one large engine mounted therein or an electric locomotive having a plural engines and generators mounted therein.

In the hybrid electric locomotive having one large engine, assuming that generated electric power is stored in a storage battery and used, since a vehicle travels by discharging the storage battery, the storage battery must be charged while the vehicle stops or travels until discharge can be performed again. When a high output is required for high-traction or high-speed traveling, the only one mounted engine is fully operated constantly to generate enough traveling power, so the storage battery cannot be sufficiently charged. The storage battery that remains still uncharged and unavailable is equivalent to a so-called dead load that just increases a weight of the vehicle, and it is a factor to deteriorate the powering performance that fundamentally locomotive has.

In the hybrid electric locomotive having medium engines, when the medium engines are operated in accordance with a charged state of the storage battery, the engines must continue operate in a state that is not necessarily optimum for the engines in terms of fuel consumption, an exhaust gas, and others. One engine may be used for power generation and charging. The other engine may be used for traveling of a vehicle.

In this case, if charging is required, one medium engine of the two medium mounted engines is used for charging only. Hence the vehicle cannot get performance that can be obtained from an output from the mounted engines. Conversely, when the two medium engines are used for traveling to assure traveling performance, the storage battery cannot be charged on a permanent basis.

Further, although individually operating the engines in optimum states is desirable, to charge the storage battery by any engine, a large engine must be rotated at a high speed to assure a fixed charging voltage, and noise is produced or fuel consumption deteriorates.

DETAILED DESCRIPTION

In general, according to one embodiment, a hybrid electric locomotive comprises: electric motors configured to drive wheels; a first engine and a second engine mounted in a vehicle main body and configured to drive generators, respectively, and a third engine which is mounted in the vehicle main body, has a smaller capacity than those of the first engine and the second engine, and is configured to drive a generator; at least one electric device mounted in the vehicle main body; a main circuit configured to supply electric power generated by the first engine, the second engine, and the generators to the electric motors; a auxiliary circuit configured to supply electric power generated by the third engine and the generator to the electric device and is connected to the main circuit; a storage battery which is connected to the main circuit and the auxiliary circuit, configured to store electric power generated by the first engine, the second engine, the third engine, and the generators, and configured to supply the stored electric power to the main circuit and the auxiliary circuit; a contactor provided between a set of the auxiliary circuit and the storage battery and the main circuit and configured to open or close connection between the set of the auxiliary circuit and the storage battery and the main circuit; and a control unit configured to control an opening/closing operation of the contactor in accordance with supply of the electric power to the main electric motors and storage of the electric power in the storage battery.

Hereinafter, a hybrid electric locomotive according to embodiments will be described with reference to the drawings.

First Embodiment

Figure 1:
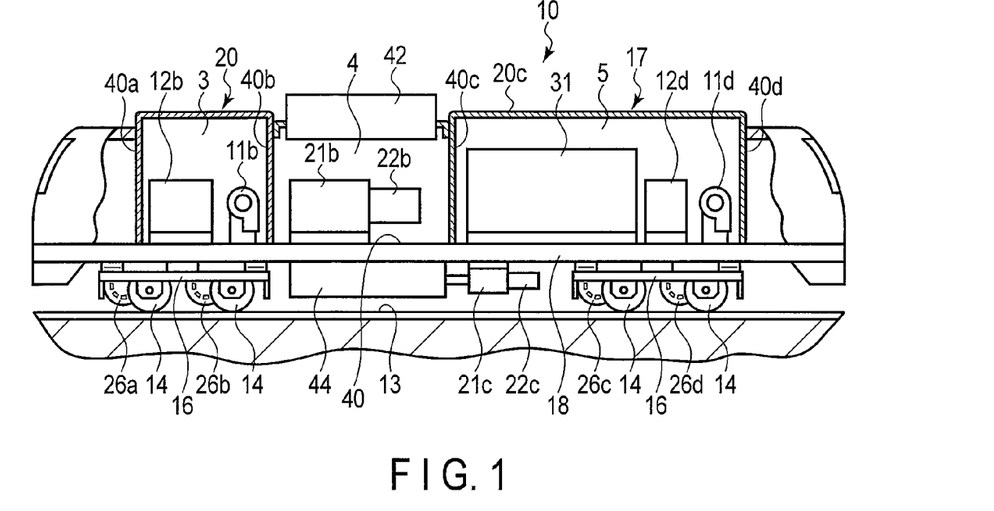
FIG. 1 is a side elevation showing a hybrid electric locomotive according to a first embodiment.
Figure 2:
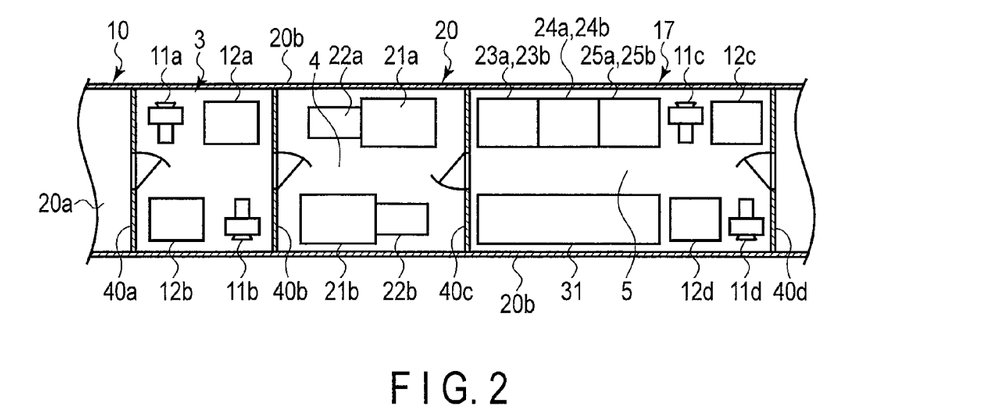
FIG. 2 is a plan view showing an internal configuration of the hybrid electric locomotive.

FIG. 1 shows an internal configuration of a hybrid electric locomotive according to a first embodiment in a partially cutaway a vehicle body of the locomotive, and FIG. 2 shows device arrangement in a machine room of the hybrid electric locomotive by eliminating a ceiling portion of the vehicle body.

As shown in FIG. 1 and FIG. 2, the hybrid electric locomotive (referred to as an electric locomotive hereinafter) 10 comprises a pair of two-axle trucks 16 each having wheels 14 provided thereto, and a vehicle body 17 supported on the trucks 16 through springs. Each truck 16 is coupled with the vehicle body 17 to be rotatable around a pivot. For example, two main electric motors 26a and 26b (26c and 26d) are mounted on each truck 16, and they are placed near two axles. Each of the main electric motors 26a and 26b is connected to the axle through a non-illustrated gear box or coupling and transmits turning force to the axle and wheels 14. The wheels 14 are placed on a rail 13. When the wheels 14 are driven by the main electric motor 26a to 26d, the electric locomotive 10 travels on the rail 13.

It is to be noted that the two-axle truck is taken as an example and described in the electric locomotive 10, but the truck is not restricted thereto, and a truck having any other configuration such as a three-axle truck may be adopted.

The vehicle body 17 comprises a base frame 18 and a vehicle main body 20 having an elongated box-like shape mounted on the base frame 18. The vehicle main body 20 comprises a floor plate 20a which is laid out on an entire surface of the base frame 18 and constitutes a floor of the vehicle body 17, a pair of side walls 20b which are erected on the base frame 18 and extend in a longitudinal direction of the vehicle body 17, a pair of end walls forming a front surface and a rear surface of the vehicle, respectively, and a ceiling wall 20c covering an upper opening of the vehicle main body, whereby the base frame 18 is covered.

The inside of the vehicle main body 20 is divided into an operator room and a plurality of machine rooms, for example, three machine rooms by partition walls 40a, 40b, 40c, and 40d. A first machine room 3, a second machine room 4, and a third machine room 4 are aligned and arranged in a traveling direction of the electric locomotive 10.

In the first machine room 3 are mounted, for example, a protective devices 12a, protective device 12b, an air blower 11a and an air blower 11b which function as auxiliary machines. Two pairs of an engine and a generator are mainly arranged in the second machine room 4. That is, a first engine 21a and a generator 22a which is driven by this first engine to generate power, a second engine 21b and a generator 22b which is driven by this second engine to generate power are mounted on the floor of the second machine room 4 to face each other with a center aisle at the center. A radiator 42 which releases heat of the engines 21a and 21b in the second machine room 4 to the outside is arranged on the ceiling of the second machine room 4. Each of the first engine 21a and the second engine 21b is, for example, a medium diesel engine, and these engines have the same capacity while considering maintenance properties and others.

Power convertors 23a, 23b, 24a, 24b, 25a, and 25b which are integrated for traveling and for auxiliary circuits, one storage battery 31, auxiliary machines 12c and 12d, air blowers 11c and 11d, a non-illustrated braking device, and others are arranged in the third machine room 5. The power convertors 23a to 25b and the storage battery 31 are mounted on the floor to face each other with a center aisle at the center.

As shown in FIG. 1, a third engine 21c, a generator 22c which is driven by the third engine to generate power, and a fuel tank 44 are mounted under the floor of the vehicle main body 20. The third engine 21c is, for example, a small diesel engine, and has a capacity smaller than those of the first and second engines 21a and 21b.

Figure 3:
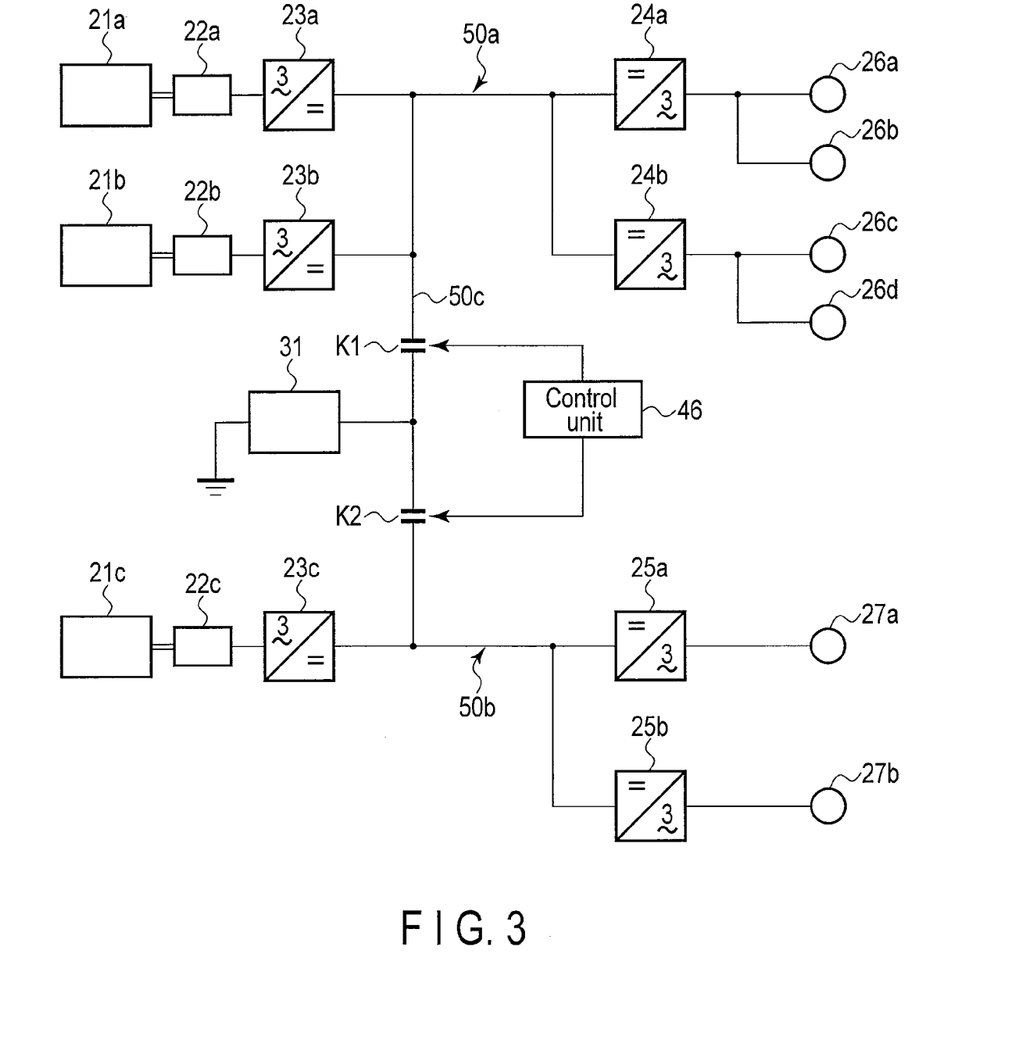
FIG. 3 is a view showing a circuit configuration of the hybrid electric locomotive.

FIG. 3 shows a basic circuit configuration of the electric locomotive 10.

As shown in FIG. 2 and FIG. 3, the first engine 21a and the second engine 21b are combined with the generators 22a and 22b to constitute two power generating devices. In recent years, since alternating-current generators are common, alternating-current power obtained by the generators 22a and 22b is temporarily converted into a direct current by the power convertors 23a and 23b. The power convertors 23a and 23b are connected to the power convertors 24a and 24b by an electric circuit 50a for traveling, the power convertor 24a is connected to the two main electric motors 26a and 26b, and the power convertor 24b is connected to the two main electric motors 26c and 26d.

The power generating device constituted of the third engine 21c and the generator 22c driven by the third engine is connected to the power convertor 23c and the power convertor 23c is connected to the power convertors 25a and 25b through a auxiliary circuit 50b. The power convertor 25a is connected to an auxiliary machine 27a such as the radiator 42 or the air blowers 11a to 11d, and it changes and controls voltages or frequencies. The power convertor 25b is connected to an auxiliary machine 27b, for example, an air compressor, and changes the electric power into a fixed voltage and a fixed frequency and then drives the auxiliary machine 27a with them.

The auxiliary circuit 50b is connected to the main circuit 50a through a direct-current circuit 50c. The storage battery 31 is connected to the direct-current circuit 50c, can store electric power generated by the generators 22a, 22b, and 22c, and can supply the stored electric power to the main circuit 50a and the auxiliary circuit 50b.

At least one contactor that opens or closes connection is provided at the direct-current circuit 50c that connects the main circuit 50a to the auxiliary circuit 50b. In this embodiment, the electric circuit comprises a first contactor K1 and a second contactor K2. The first contactor K1 is provided at the direct-current circuit 50c between the storage battery 31 with the auxiliary circuit 50b and the main circuit 50a. The second contactor K2 is provided at the direct-current circuit 50c between the auxiliary circuit 50b and the storage battery 31. The first contactor K1 and the second contactor K2 can open or close the circuit connection. Their opening/closing operation is controlled by a control unit 46. Each of the first contactor K1 and second contactors K2 is constituted of, for example, an electromagnetic switch.

Depending on each train line along which the electric locomotive 10 is operated, in general, if the operation of the electric locomotive is to pull an express train or a freight train. An output of one main electric motor is approximately 500 kW, and an output (a capacity) of approximately 1000 kW is required for the first engine 21a and also the second engine 21b in the configuration depicted in FIG. 3. On the other hand, since the power required for driving the auxiliary machines 27a and 27b is generally approximately 100 to 200 kW, an engine output (capacity) of the third engine 21c is smaller than those of the first engine 21a and the second engine 21b. In this case, the third engine 21c and the generator 22c can be arranged under the floor of the vehicle body 17, and commercially power pack is available, for example.

Here, since a large noise source is the large first engine 21a and second engine 21b used for traveling, these two engines are arranged in the second machine room 4 as shown in FIG. 1 and FIG. 2. Although air intake or air ventilation is required for the engines, even when an inlet is provided on a side surface of the vehicle body 17, an acoustic absorption duct using an acoustic absorbent or an acoustic absorption louver can effectively suppress noise generated outside the vehicle from the engines.

Further, since the second machine room 4 becomes a high temperature due to heat generated from the first and second engines 21a and 21b and also has high radiation heat, the storage battery 31 is arranged in the third machine room 5 where the power convertors 23a to 25b are arranged.

The third engine 21c is a small engine and its noise is basically small even though this engine may be continuously operated, and hence it can be arranged under the floor of the vehicle body 17.

An operation of the electric locomotive 10 previously described will now be described in detail with reference to FIG. 3.

When the storage battery 31 is fully charged, electric power is supplied from the storage battery 31 to drive the main electric motors 26a to 26d, the auxiliary machine 27a and the auxiliary machine 27b. The control unit 46 stops the all of the first engine 21a, second engine 21b and third engine 21c and electric power for traveling and driving auxiliary machine driving is supplied from the storage battery 31 to the main electric motors 26a to 26d, the auxiliary machine 27a through the first electric circuit 50a and the second electric circuit 50b, in a state that the first contactor K1 and second contactors K2 are ON (connected).

For example, in a case where a traveling load is small because the electric locomotive 10 is used, or in a case where a load of a train to be pulled is small because of a short train, if traveling is possible using the storage battery 31 only, the control unit 46 continues traveling in the state that all the engines are stopped.

Here, when powering is turned off and the storage battery 31 is to be charged for subsequent traveling, the control unit 46 turns on (connects) the second contactor K2, changes over the first contactor K1 to an opened state, and starts an operation of the third engine 21c alone. To start up the third engine 21c, it is possible to use a method of using the storage battery 31 to drive the generator 22c or a method of utilizing compressed air to start up the third engine by an air starter since the auxiliary machine 27b is in operation and the compressed air is prepared.

In the case of power running with charging the storage battery 31 by the third engine 21c, the first engine 21a and the second engine 21b are to be started up, and then electric power is supplied to the power convertor 24a, the power convertor 24b and the main electric motors 26a to 26d through the main circuit 50a. Therefore, the third engine 21c can assure powering performance for the two engines, while the third engine can continue the operation with a voltage suitable for charging the storage battery 31. Of course, when a load is light and one engine can accept the load in order to minimize, for example, generation of an exhaust gas, that is to say, when a powering notch is low, the first engine 21a is operated, and the second engine 21b is stopped, for example. However, if the first engine 21a is determined as an engine used when a load is light and the second engine 21b is determined as an engine used when a load is heavy in advance, and since performance of the first engine 21a is deteriorated due to aging during highly frequently use, for example, the first engines 21a and the second engines 21b are alternately operated to substantially uniform comprehensive operation hours of both the engines. The first and second engines 21a and 21b can be also started up using the generators 22a and 22b or the air starter like the start-up method of the third engine 21c.

When using electric power from the storage battery 31 for traveling, the control unit 46 connects the first contactor K1 and opens the second contactor K2, whereby electric power from the storage battery 31 can be added to electric power obtained from the first and second engines 21a and 21b.

When a maximum output on a rising slope is required, both the first and second contactors K1 and K2 are turned on (connected), whereby all the electric power obtained from the three engines 21a to 21c and the storage battery 31 can be supplied to the main electric motors 26a to 26d and used for traveling. However, since motive power of the auxiliary machines 27a and 27b is required even in this case, a total of "power of the first, second, and third engines 21a, 21b, and 21c+the storage battery 31−the auxiliary circuit 50b" is maximum electric power that can be actually used for traveling.

Usually, it is often the case that traveling is effected while suppressing a speed on a downhill slope after traveling uphill, and hence the storage battery 31 can be charged with regenerative power obtained from the main electric motors 26a to 26d in such a case. Since a voltage suitable for charging must be used in this case, the control unit 46 turns on the first contactor K1, opens the second contactor K2, stops the first and second engines 21a and 21b after appropriate idling, and operates the third engine 21c. As a result, the auxiliary machines 27a and 27b are driven with electric power from the third engine 21c while charging the storage battery 31 with electric power supplied from the power convertors 24a and 24b by using a regeneration brake. After the charge of the storage battery 31 is finished, the control unit 46 opens the first contactor K1, turns on the second contactor K2, operates the auxiliary machines 27a and 27b using the storage battery 31, and stops the third engine 21c.

In addition, to obtain an output from the engine that is temporarily stopped during the above-described operation, idling effected for an appropriate time is generally required because of an appropriate number of revolutions, and it is difficult to precipitously gain speed and apply a large load immediately after starting up the stopped engine. Therefore, if not only a powering handle is turned on and the notch is used to start up the stopped engine but also an operator manually starts up the stopped engine by using an engine startup switch in advance, a large output (pulling force or a speed) can be obtained without taking time much when the powering handle is placed at a high position.

When an engine dedicated to charging in the three engines is out of service because of a failure and the like, the remaining two engines can be used for charging the storage battery, traveling, and serving as a power source of the auxiliary circuit. For example, when the second engine 21b in FIG. 3 cannot be used, powering can be continued by the first engine 21a, and the third engine 21c can be used for charging the storage battery and driving the auxiliary machines. The first and second contactors K1 and K2 are opened and turned on like the above description. In this case, a maximum output that can be used for traveling is a total of "power of the first engine 21a+the third engine 21c+the storage battery−the auxiliary circuit".

A hybrid electric locomotive according to other embodiments will now be described. In the other embodiments explained below, reference numerals equal to those in the first embodiment denote parts equal to those in the first embodiment to omit a detailed description of these parts.

Second Embodiment

Figure 4:
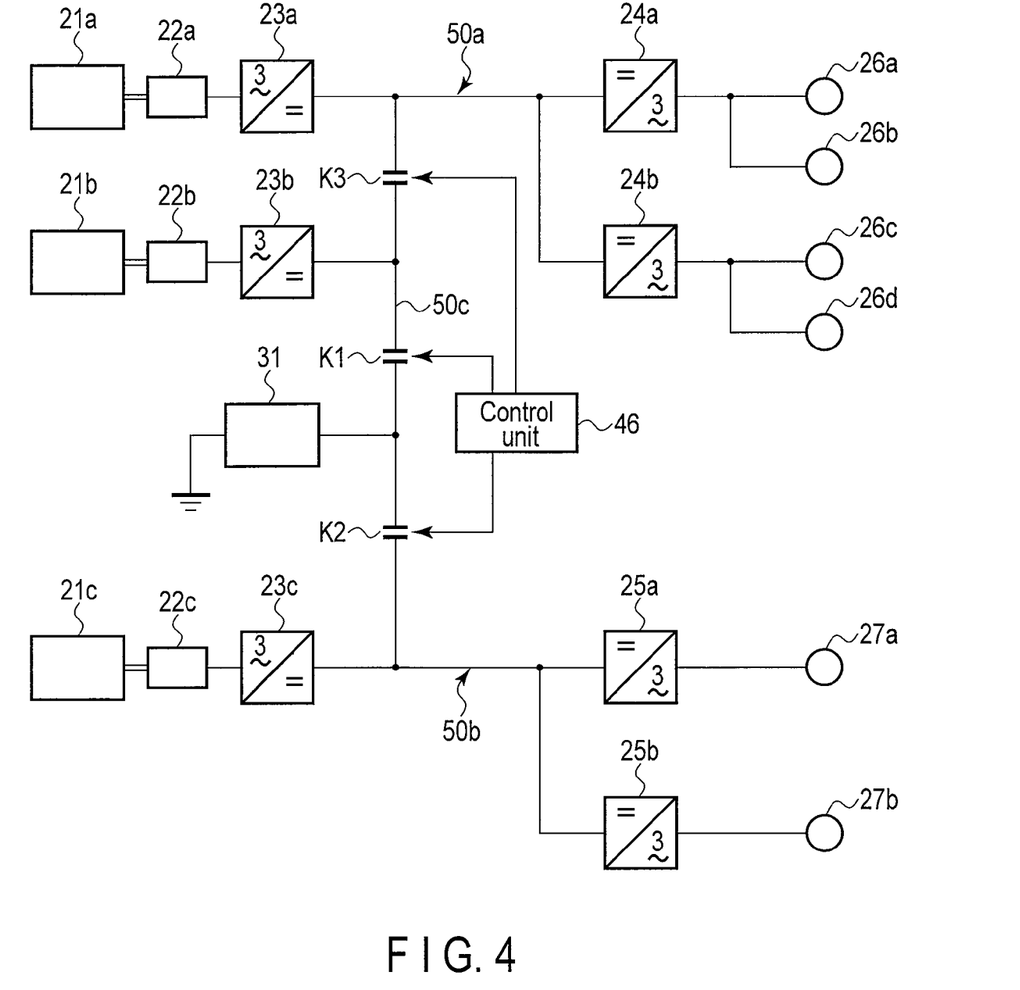
FIG. 4 is a view showing a circuit configuration of a hybrid electric locomotive according to a second embodiment.

When considering a situation that the third engine 21c in FIG. 3 cannot be used as another example, adding a third contactor K3 enables improving redundancy like an electric locomotive according to a second embodiment depicted in FIG. 4.

In a direct-current circuit 50c, the third contactor K3 is provided between a power convertor 23a and a power convertor 23b, that is to say, between a first engine 21a and a second engine 21b to open or close the direct-current circuit 50c. An opening/closing operation of this third contactor K3 is likewise controlled by a control unit 46.

When the third contactor K3 is opened and first and second contactors K1 and K2 are turned on, an output from the first engine 21a can be used for an output of a main electric motor for traveling, and an output from the second engine 21b can be used for charging a storage battery 31 and driving auxiliary machines 27a and 27b. Furthermore, since the storage battery 31 can be used as auxiliary machine motive power, after the storage battery 31 is rapidly charged in a short time by the second engine 21b that is larger than the third engine 21c in scale, the second engine 21b can be stopped. As a result, it is possible to prevent the second engine 21b as a large engine from being operated for a long time in a light-load operating state that exhaust gas characteristics or fuel consumption is poor in accordance with auxiliary machines having small capacities.

It is to be noted that, in the second embodiment, other structures of the electric locomotive are equal to those in the first embodiment, and like reference numerals denote like parts to omit a detailed description thereof.

According to the thus-configured hybrid electric locomotives according to the first embodiment and the second embodiment, when connection and opening of the electric circuits are controlled using the contactors in accordance with traveling of the vehicle, charge of the storage battery, and driving of the auxiliary machines, outputs from the engines can be efficiently used as traveling motive power without reducing charging efficiency of the storage battery. Therefore, as compared with the conventional technology that one large engine alone is mounted or two medium engines are mounted, not only noise is reduced or fuel consumption is improved but also the electric locomotive having high reliability including redundancy can be obtained.

Third Embodiment

Figure 5:
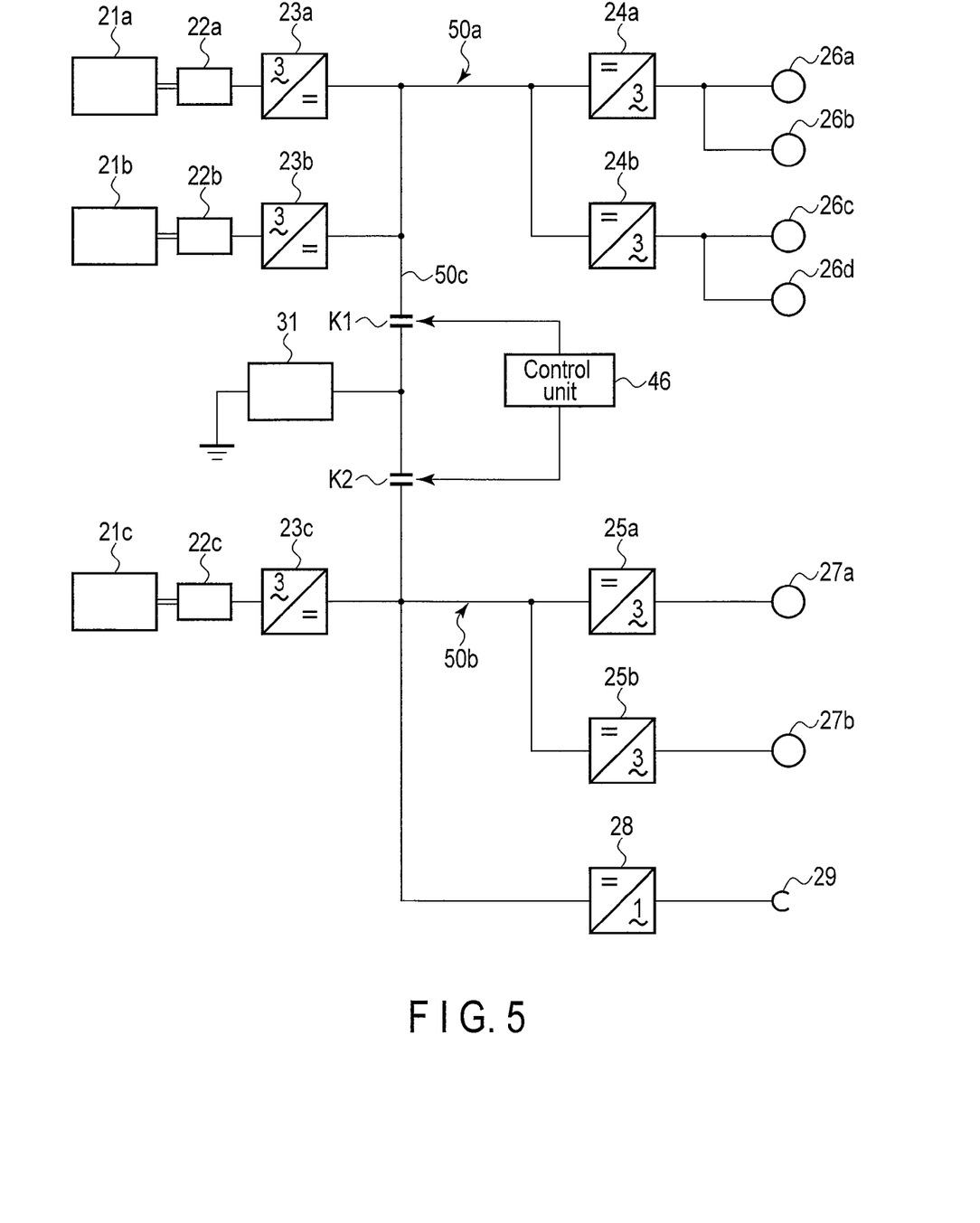
FIG. 5 is a view showing a circuit configuration of a hybrid electric locomotive according to a third embodiment.

FIG. 5 shows a circuit configuration of a hybrid electric locomotive according to a third embodiment.

According to this embodiment, an electric locomotive further comprises a power convertor 28 connected to a auxiliary circuit 50b, and this power convertor 28 can be connected to a power supply of another vehicle through an electric coupler 29.

Usually, alternating-current power is drawn into a passenger car for a service power supply. In case of a train with a fixed number of cars in which the hybrid electric locomotive according to this embodiment is arranged at each of both ends of the passenger cars, when a third engine 21c is cannot be used, the power convertor 28 is connected to the service power supply through the electric coupler 29, and a storage battery 31 can be charged using this service power supply. Furthermore, according to the third embodiment, like the first embodiment, it is possible to provide a highly reliable hybrid electric locomotive that can efficiently perform traveling and charging, reduce noise, and improve fuel consumption.

Fourth Embodiment

Figure 6:
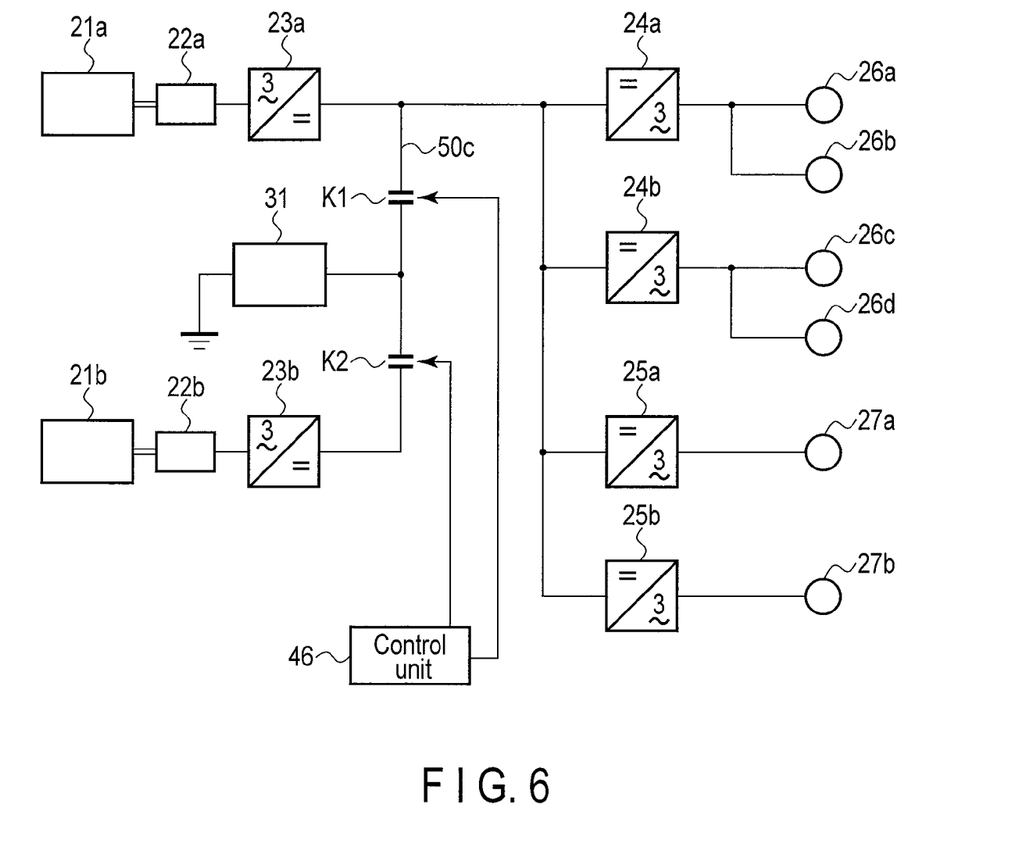
FIG. 6 is a view showing a circuit configuration of a hybrid electric locomotive according to a fourth embodiment.

FIG. 6 shows a circuit configuration of a hybrid electric locomotive according to a third embodiment. As shown in this drawing, the electric locomotive comprises two sets of an engine and a generator. That is, the electric locomotive comprises a first engine 21a, a generator 22a driven by this first engine to generate power, a second engine 21b, a generator 22b driven by this second engine to generate power, power convertors 23a and 23b connected to the generators 22a and 22b, and a storage battery 31. Moreover, the electric locomotive comprises main electric motors 26a, 26b, and 26c that drive axles, respectively, auxiliary machines 27a and 27b such as an air blower, a radiator, or a protective device, and power convertors 25a and 25b connected to these auxiliary machines.

The first engine 21a and the second engine 21b are combined with the generators 22a and 22b, respectively, to constitute two sets of power generating devices. Alternating-current power obtained from the generators 22a and 22b is temporarily converted into a direct current by the power convertors 23a and 23b. The power convertors 23a and 23b are connected to power convertors 24a and 24b and the power convertors 25a and 25b through a direct-current circuit 50c for traveling, the power convertor 24a is connected to the two main electric motors 26a and 26b, and the power convertor 24b is connected to the two main electric motors 26c and 26d.

The storage battery 31 is connected to the direct-current circuit 50c between the first engine 21a and the second engine 21b so that it can store electric power generated by the generators 22a and 22b and supply the stored electric power to the direct-current circuit 50c.

In the direct-current circuit 50c, a first contactor K1 that opens or closes connection is provided between the first engine 21a and the storage battery 31, and a second contactor K2 that opens or closes connection is provided between the second engine 21b and the storage battery 31. Each of the first and second contactors K1 and K2 is constituted of, for example, an electromagnetic switch, and its opening/closing operation is controlled by a control unit 46.

According to the thus configured hybrid electric locomotive of the fourth embodiment, connection and opening of the electric circuits are controlled by the first contactor K1 and the second contactor K2 in accordance with traveling of the vehicle, charge of the storage battery, and driving of the auxiliary machines, the electric power from the engines and the electric power from the storage battery are utilized to drive the main electric motors 26a to 26d and the auxiliary machines 27a and 27b, and the electric power from the engines and regenerative energy from the driving side can be stored in the storage battery 31.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Although diesel engines are used as the first to third engines in the foregoing embodiments, the present invention is not restricted thereto, and gasoline engines may be used. The auxiliary machines are not restricted to those in the foregoing embodiments, and various kinds of auxiliary machines can be selected. The circuit configuration of the electric locomotive is just an example of the embodiments, and it does not limit positions of the contactors or a connecting method of the circuits.

What is claimed is:

1. A hybrid electric locomotive comprising:
   electric motors;
   a first engine and a second engine mounted in a vehicle main body for driving a first generator and a second generator, respectively;
   a third engine mounted in the vehicle main body for driving a third generator, said third engine having a smaller capacity than a capacity of the first engine and a capacity of the second engine;
   at least one electric device mounted in the vehicle main body;
   a main circuit configured to supply electric power generated by the first engine, the second engine, and the first and second generators to the electric motors;
   an auxiliary circuit which is configured to supply electric power generated by the third engine and the third generator to the electric device, and which is connected to the main circuit;

a first contactor provided between the main circuit and the auxiliary circuit and configured to open or close connection between the main circuit and the auxiliary circuit;

a storage battery which is connected between the first contractor and the auxiliary circuit, and which is configured to store electric power generated by the first engine, the second engine, the third engine, and the first generator, the second generator and the third generator, and which is also configured to supply the stored electric power to the main circuit and the auxiliary circuit; and a control unit configured to control an opening/closing operation of the first contactor in accordance with supply of the electric power to the electric motors and storage of the electric power in the storage battery.

2. The hybrid electric locomotive according to claim 1, further comprising a contactor provided between the auxiliary circuit and the storage battery and configured to open or close connection between the auxiliary circuit and the storage battery, wherein the control unit is configured to control an opening/closing operation of the second contactor in accordance with supply of the electric power to the electric motors and storage of the electric power in the storage battery.

3. The hybrid electric locomotive according to claim 2, wherein the capacity of the first engine and the capacity of the second engine are the same.

4. The hybrid electric locomotive according to claim 2, further comprising a third contactor provided between the first generator driven by the first engine and the second generator driven by the second engine in the main circuit and configured to open or close connection between the second and third generators and the electric motors, wherein the control unit is configured to control an opening/closing operation of the third contactor in accordance with supply of the electric power to the electric motors and storage of the electric power in the storage battery.

5. The hybrid electric locomotive according to claim 4, wherein the capacity of the first engine and the capacity of the second engine are the same.

6. The hybrid electric locomotive according to claim 4, further comprising a power convertor which is mounted in the vehicle main body, and which is connected to the auxiliary circuit, and which is configured to be capable of connecting to a power supply of another vehicle, and which is configured to supply the electric power to the storage battery.

7. The hybrid electric locomotive according to claim 6, wherein the first and second engines and the first and second generators are mounted on a floor of the vehicle main body, and the third engine and the third generator driven by the third engine are installed under the floor of the vehicle main body.

8. The hybrid electric locomotive according to claim 7, wherein the capacity of the first engine and the capacity of the second engine are the same.

9. The hybrid electric locomotive according to claim 1, further comprising a power convertor which is mounted in the vehicle main body, and which is connected to the auxiliary circuit, and which is configured to be capable of connecting to a power supply of another vehicle, and which is configured to supply the electric power to the storage battery.

10. The hybrid electric locomotive according to claim 1, wherein the first and second engines and the first and second generators are mounted on a floor of the vehicle main body, and the third engine and the third generator driven by the third engine are installed under the floor of the vehicle main body.

11. The hybrid electric locomotive according to claim 2, wherein the first and second engines and the first and second generators are mounted on a floor of the vehicle main body, and the third engine and the third generator driven by the third engine are installed under the floor of the vehicle main body.

12. The hybrid electric locomotive according to claim 1, wherein the capacity of the first engine and the capacity of the second engine are the same.

13. The hybrid electric locomotive according to claim 1, wherein the capacity of the first engine and the capacity of the second engine are the same.

* * * * *